(No Model.)

A. ANDERSON.
HAY LOADER.

No. 497,620. Patented May 16, 1893.

Witnesses
Will T. Norton
Geo. H. Brown Jr.

Inventor
Anton Anderson
By W. W. Dudley & Co.
his Attorneys

UNITED STATES PATENT OFFICE.

ANTON ANDERSON, OF CHICAGO, ILLINOIS.

HAY-LOADER.

SPECIFICATION forming part of Letters Patent No. 497,620, dated May 16, 1893.

Application filed December 5, 1892. Serial No. 454,082. (No model.)

*To all whom it may concern:*

Be it known that I, ANTON ANDERSON, a citizen of the United States, residing at Chicago, in the county of Cook and State of Illinois, have invented certain new and useful Improvements in Hay-Loaders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in that class of hay loaders which are adapted to be attached to the rear of a wagon, and which are provided with a series of alternately vibrating rakes, operating to take the hay from the ground, and carry it over an inclined platform and deposit it in such wagon.

The object of my invention is to provide such a loader with new and novel mechanism for permitting the individual adjustment of the rake bars, to adapt the loader to follow the inequalities of the ground over which it is drawn.

My invention consists in the construction, relative arrangement and operation of the several parts constituting my invention all of which will be hereinafter fully and clearly described and specifically claimed.

Figure 1:
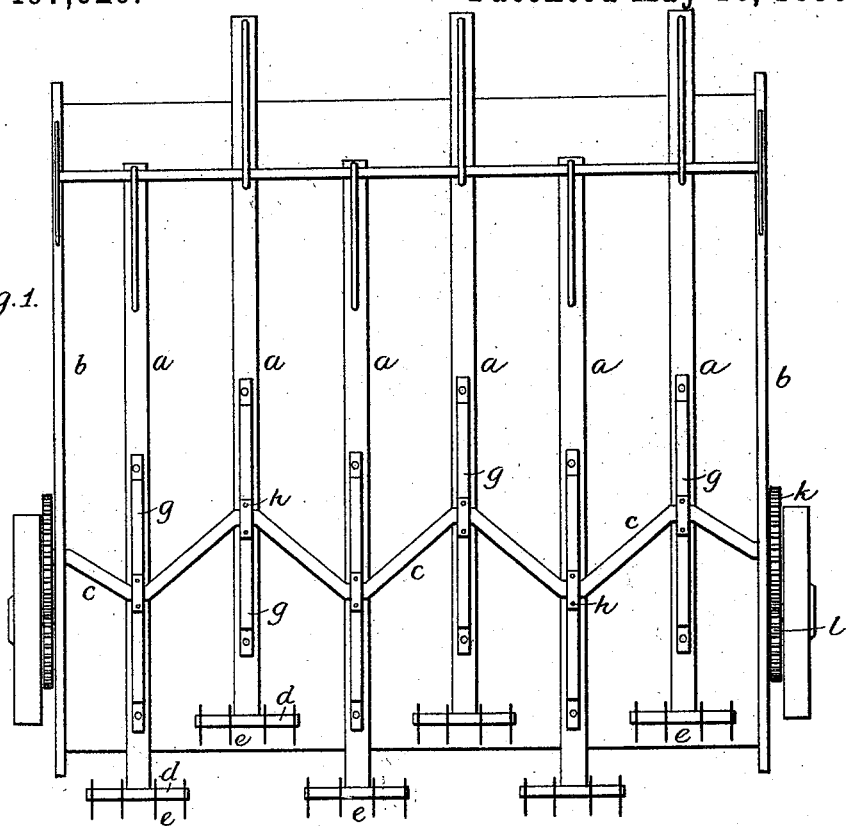
Figure 2:
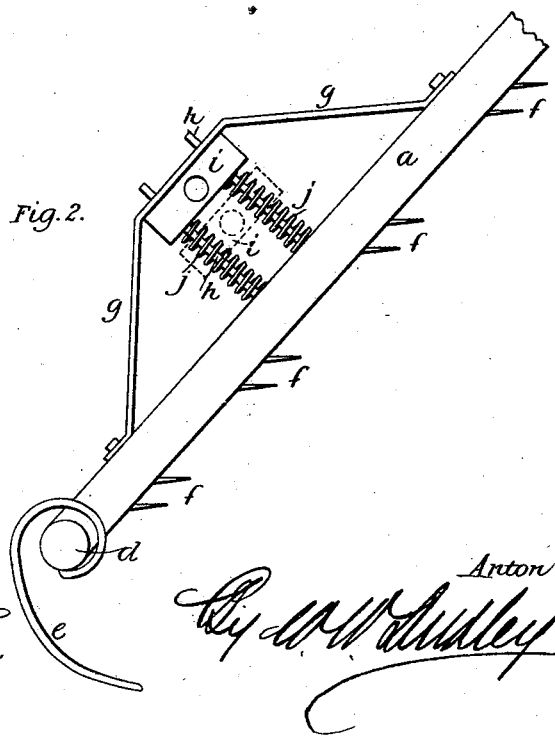

Reference being had to the accompanying drawings which form a part of this specification, Figure 1 represents in plan view a hay loader with my improvement thereon. Fig. 2 is a detail of a rake bar with the device applied thereto the different positions being indicated by full and dotted lines.

The reference letters $a$ $a$ denote the rake bars which are mounted on the platform $b$ in such a manner as that they are permitted to vibrate through the movement of the double-crank shaft $c$, as is well understood. At the lower end of each bar is a cross-head $d$ on which is arranged a series of spring rake-teeth $e$ $e$ which operate to gather the hay from the ground and deposit it on the inclined platform; and $f$ $f$ are a series of inclined teeth set in the under side of the bars, which operate to carry the hay, with each upward movement of the bars, to the top of the platform, from which it is discharged into the wagon to which the loader is attached.

To the upper side of each of the rake bars is secured a brace or bracket $g$, and $h$ $h$ are guide rods which are secured at their upper ends to this bracket, and at their lower ends to the bar as shown. Movably mounted on these rods is a block $i$ provided with a horizontal bearing in which is mounted the crank which imparts movement to its respective bar; and arranged below this block are two coil springs $j$ $j$ which surround the guide rods and are interposed between the bottom of the block, and the top of the bar, and operate by their tension to keep the rake teeth in contact with the surface of the ground. The rake teeth by reason of the adjustability of the bars are permitted to follow the inequalities of the ground, and should any obstacle be met with by the teeth, the latter are automatically raised until the obstruction is passed. By this means, the liability of the teeth becoming bent or broken is obviated, and the hay may be gathered with equal facility on even or uneven surfaces.

The crank shaft is mounted in suitable bearings on the sides of the platform, and has fixedly secured at one end thereof a gear wheel $k$ which engages a gear $l$ mounted on one of the traction wheels $m$ by which the motion is imparted.

My invention combines simplicity of construction and effectiveness in operation, and the parts being few the liability to become broken or get out of order is reduced to the minimum.

I claim as my invention—

1. In a hay loader of the class described, the combination with the vibrating rake bar and with the journal box of the crank shaft movable thereon and at right angles thereto, of springs interposed between said box and bar whereby a yielding connection between the bar and shaft is permitted.

2. In a hay loader of the class described, the combination with the vibrating rake bar having a bracket thereon, and guide rods connecting said bar and bracket, of the journal box for the crank shaft movable on said rods and spiral springs encircling the rods and interposed between the box and bar, for the purpose set forth.

In testimony whereof I affix my signature in presence of two witnesses.

ANTON ANDERSON.

Witnesses:
WILLIAM S. LEWIS,
PLEASANT AMICK.